United States Patent [19]

Matsuyama

[11] Patent Number: 4,953,226
[45] Date of Patent: Aug. 28, 1990

[54] ELECTRONIC APPARATUS WITH HAND-WRITTEN PATTERN RECOGNITION FUNCTION

[75] Inventor: Shigeru Matsuyama, Yokohama, Japan

[73] Assignee: Canon Kabushiki Kaisha, Tokyo, Japan

[21] Appl. No.: 393,032

[22] Filed: Aug. 10, 1989

Related U.S. Application Data

[63] Continuation of Ser. No. 287,638, Dec. 21, 1988, abandoned, which is a continuation of Ser. No. 865,451, May 21, 1986, abandoned.

[30] Foreign Application Priority Data

May 31, 1985 [JP] Japan .................................. 60-116719

[51] Int. Cl.⁵ ............................................... G06K 9/00
[52] U.S. Cl. ............................................ 382/13; 382/3
[58] Field of Search ....................................... 382/13, 3

[56] References Cited

U.S. PATENT DOCUMENTS 4,654,874 3/1987 Yamamoto ............................ 382/13

Primary Examiner—Theodore M. Blum
Attorney, Agent, or Firm—Fitzpatrick, Cella, Harper & Scinto

[57] ABSTRACT

An electronic apparatus with pattern recognition function is disclosed. This apparatus has one key pad used for inputting both command data for giving instruction for controlling the apparatus and hand-writing data to be pattern-recognized. The input data are processed depending on which area of the key pad they have been input in. A CPU is also included for deciding how to process the input data. An operator can input both handwriting data and command data from one single key pad and thus troublesome operations, such as inputting handwriting data from a key pad and also inputting command data from a key board, can be eliminated.

5 Claims, 4 Drawing Sheets

ELECTRONIC APPARATUS WITH HAND-WRITTEN PATTERN RECOGNITION FUNCTION

This application is a continuation of application Ser. No. 07/287,638 filed Dec. 21, 1988 which is a continuation of Application Ser. No. 06/865,451 filed May 21, 1986 both abandoned.

BACKGROUND OF THE INVENTION

1. Field of the Invention

The present invention relates to an electronic apparatus with a hand-written pattern recognition function, and more particularly to an electronic apparatus with a hand-written pattern recognition function capable of recognizing a hand-written pattern input with a hand-written input key pad and processing it.

2. Related Background Art

A conventional electronic apparatus having a hand-written character input function is provided with a control keyboard as well as a hand-written character input key pad. With this apparatus, the hand-written character input key pad is used only for inputting hand-written characters, while the control keyboard is used for narrowing the search range of dictionaries and designating the character type to raise the quality of recognition percentage and speed, for switching the data input/output mode, or the like. Therefore, every time these controls are required in the course of recognizing hand-written characters, the operator must turn his eyes off the key pad and move his hand to handle a corresponding control key, thus resulting in a low operability. In addition, provision of these control keys leads to a high cost of the apparatus and does not satisfy the long felt need to reduce the number of control keys.

SUMMARY OF THE INVENTION

In view of the above, it is an object of the present invention to provide an electronic apparatus which eliminates the above-described disadvantages.

It is another object of the present invention to solve the problem that when a control function associated with recognizing hand-written characters or patterns is required, the operator must turn his eyes off the key pad and move his hand to handle a corresponding control key mounted on a control keyboard.

It is still another object of the present invention to provide an electronic apparatus with an input device used to input both hand-written data and instruction commands for the apparatus.

DETAILED DESCRIPTION OF THE EMBODIMENT

An embodiment of the electronic apparatus with a hand-written pattern recognition function according to the present invention will now be described with reference to the accompanying drawings, wherein recognized data of hand-written patterns is stored for reading and displaying the hand-written patterns.

Figure 1:
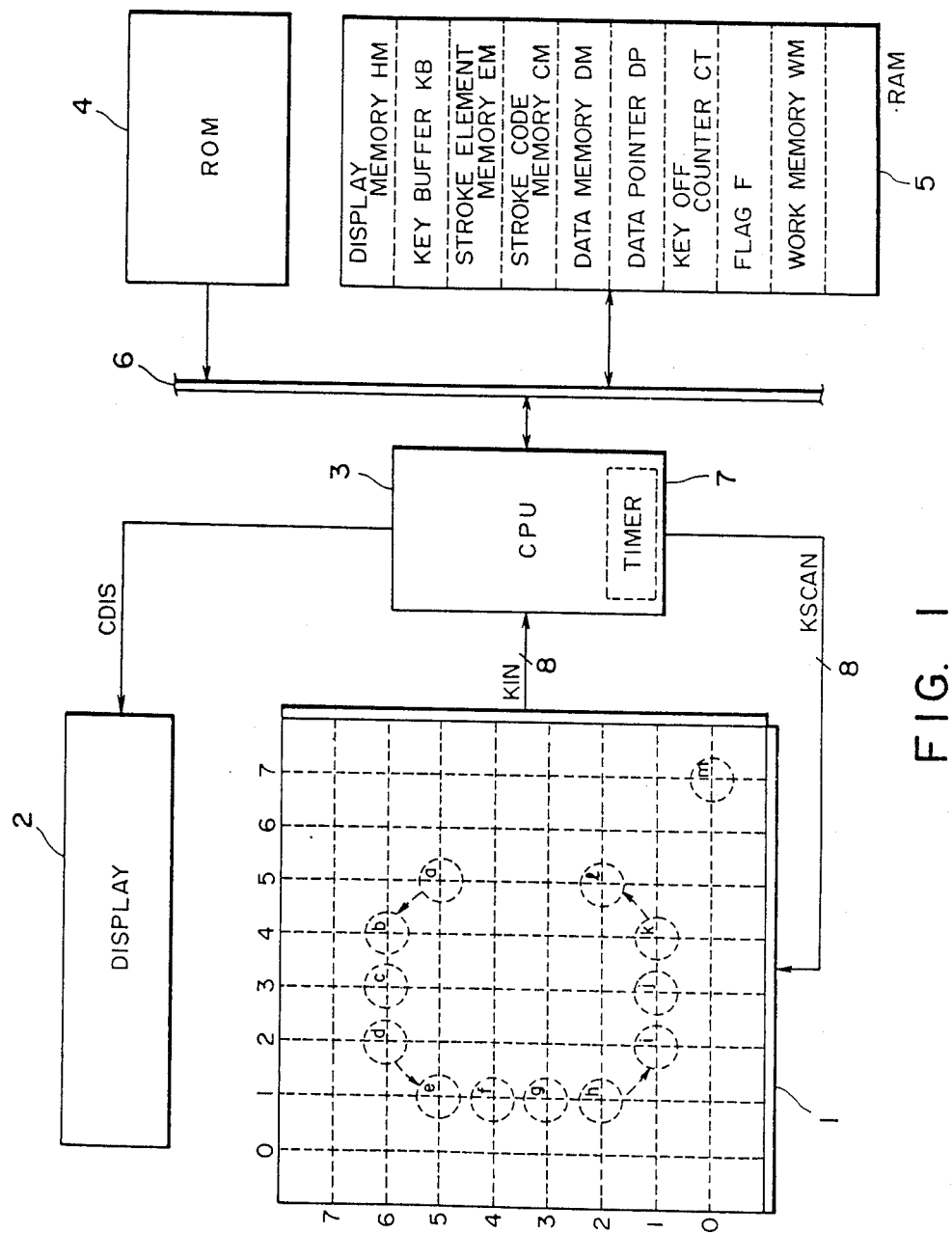
FIG. 1 is a block diagram showing an outline of the apparatus according to an embodiment of the present invention.
Figure 2:
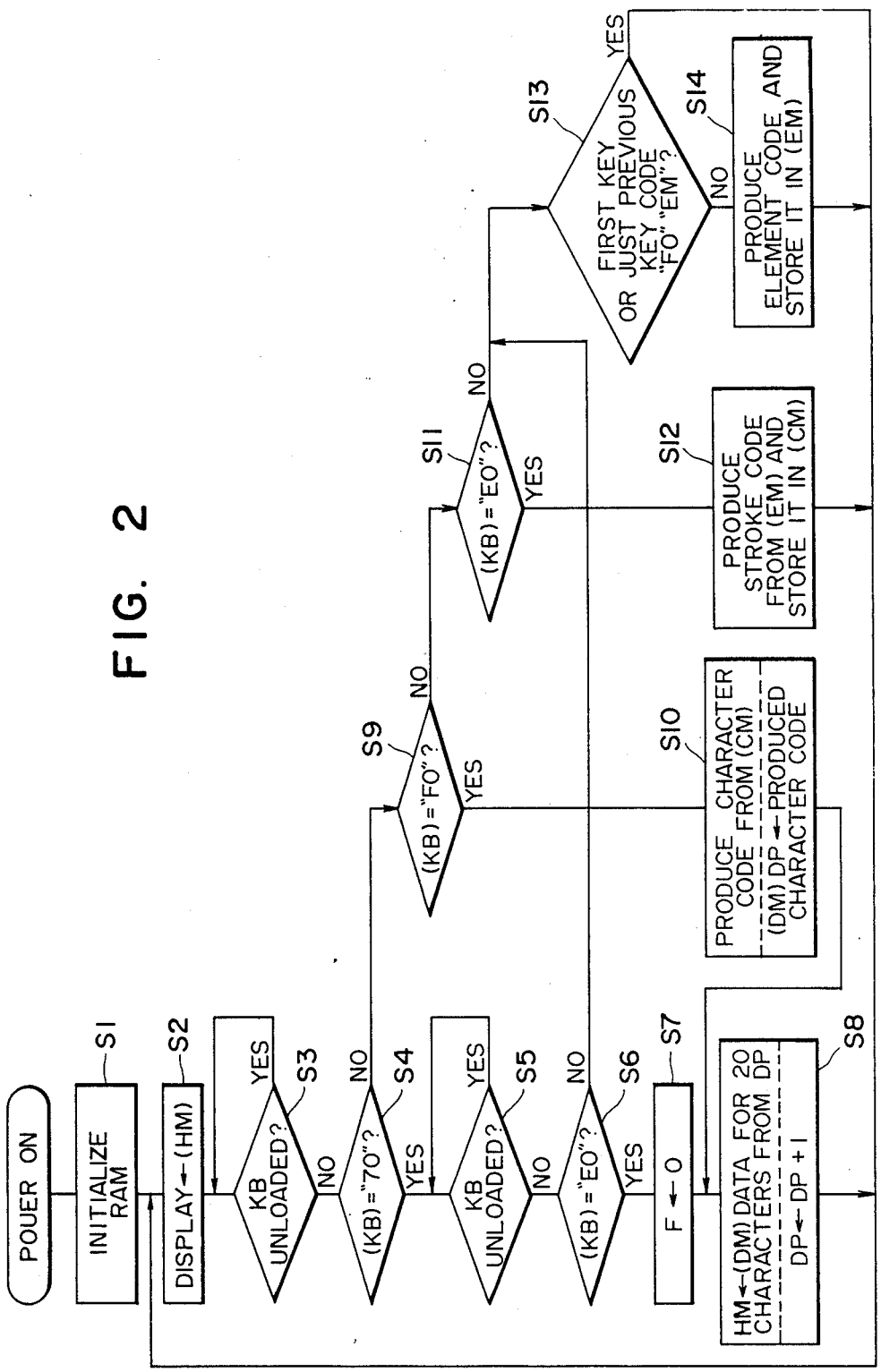
FIG. 2 is a main flow chart showing the processes performed in accordance with certain programs.
Figure 3:
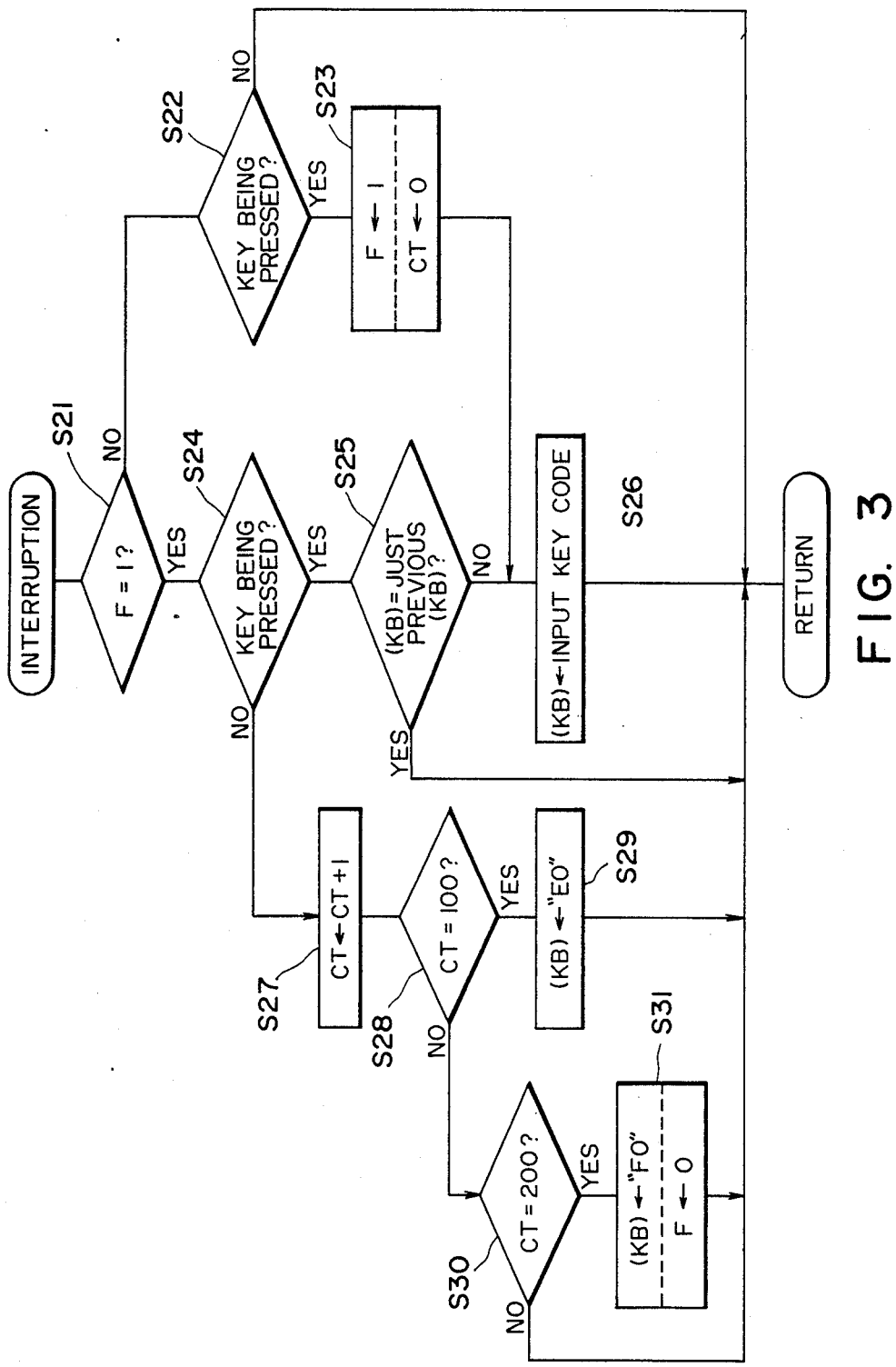
FIG. 3 is a flow chart showing an interruption routine of the processes.

FIG. 1 is a block diagram showing an outline of the apparatus according to the embodiment of the invention. In the figure, a hand-written character signal lines (KSCAN) and eight key signal read lines (KIN), respectively disposed in an 8×8 matrix connection. A particular operation area m on the key pad (KPAD) 1 is used for both inputting hand-written data and designating a control function. The particular operation area m may be provided plurally. A liquid crystal display 2 is for example of a dot matrix type and displays data stored in a display memory HM of a RAM 5 under control of a display control signal CDIS from a central processing unit (CPU) 3. The CPU 3 constructed of a microprocessor and the like operates as a sequential control circuit composed of an unrepresented, clock pulse generator, delay circuit, gate circuit and other logic circuits. A read-only memory (ROM) 4 stores micro instructions by which the CPU 3 executes control procedures such as shown in FIGS. 2 and 3 while supplying a control signal to the display 2 or the like. A random-access-memory (RAM) 5 capable of reading and writing includes: a flag F for storing the operation status of the apparatus; display memory FM for storing display data; key buffer KB for temporarily storing key input codes; stroke element memory EM for storing a stroke element which is a test result of the direction of a handwriting and which has been obtained by comparing he previous key input code with the current key input code; stroke code memory CM for storing a recognition-result code of a stroke recognized in accordance with the key up/-down operation; data memory DM for storing a recognition result code of a character or pattern recognized in accordance with the connection relation between stroke codes; data pointer DP for indicating a read/-write address of the data memory; key-off counter CT for counting preset times after the key pad is released; work memories for use in executing pattern recognitions; and the like. A bus line BUS 6 is used for transference of memory addresses and data, interconnecting the CPU 3, ROM 4 and RAM 5. A timer 7 is for periodically producing interruptions by counting a preset time.

FIGS. 2 and 3 show the key input operation according to the embodiment, wherein FIG. 2 is a main flow chart and FIG. 3 is a key input interruption routine. The interruption routine shown in FIG. 3 monitors the operation of the key pad 1 by interrupting the main routine every 25 msec counted by the timer.

First, upon turning on the power source, the content of the RAM 5 is initialized at step S1 of FIG. 1. Thereafter at step S2, data in the display memory HM is transferred to and displayed on the display 2. At step S3 any input of a key code into the key buffer KB is stored.

The interruption routine of FIG. 3 is executed every 25 msec irrespective or the presence of absence of a key input. If the key pad is not depressed, step S21 follows step 22 where no depression of the key pad is checked and the interruption routine returns to the main routine.

If the operator depresses portion a on the key pad (KPAD) 1, then the steps advance in the order of S21→S22→S23→S26 in the interruption routine of FIG. 3 to set the flag F, clear the key-off counter CT and store a key code "55" corresponding to the coordinate a into the key buffer KB.

Figure 4:
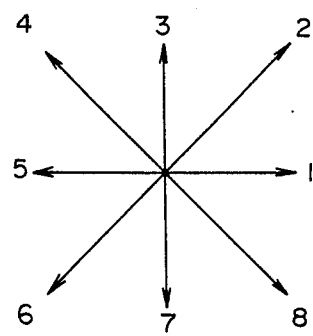
FIG. 4 shows a relationship between the direction of a stroke element and its stroke element code.
Figure 5:
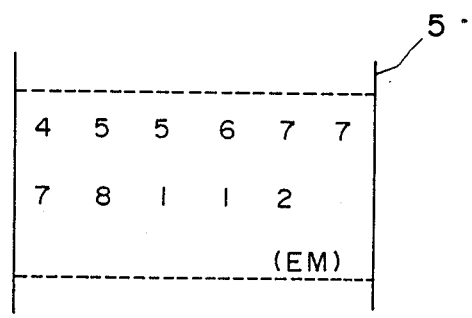
FIG. 5 shows an example of a set of stroke element codes stored in the stroke element memory.

Then, at step S3 of FIG. 2 storage of the key code "55" in the key buffer KB is detected so that the steps advance in the order of S4→S9→S11→S13. Since the key code is that of the first depressed key, step S13 is affirmed to return to step S2 where data stored in the display memory HM (at this time instant data is present) is displayed on the display. At step S3 a next key input is stored. If the operator continues to depress portion a, it is judged at interruption step S25 that the previous key code and the current key code are identical so that the latter is not stored in the key buffer KB. Alternatively if the depression of the key pad is displaced to portion b, then the steps advance in the order of S21→S24→S25→S26 in the interruption routine of FIG. 3 to store a new key code "46" in the key buffer KB. Storage of this key code is detected at step S3 of FIG. 2 following steps S4→S9→ S11→S13, similarly top the case of the depression of portion a. Since it is a second key input followed by the input at portion a, step S13 follows step S14 where a stroke element code (in this case, "4") corresponding to the direction of the stroke element is generated and stored in the stroke element memory EM, the stroke code being obtained by comparing the coordinates of the previous key code "55" and the current key code "46" code and referencing to the relationship shown in FIG. 4. thereafter, depression of the key pad (KPAD) 1 is displaced, as shown in FIG. 1, in the order of c→d→e→f→g→h→i→j→k→l and the similar processings as described above are performed. Accordingly, a set of stroke elements are stored in the stroke element memory EM as shown in FIG. 5. After release of depression of the key pad at portion 1, steps advance in the order of S21→S24→S27 in the interruption routine of FIG. 3 to count the period during the release of depression in multiple units of 25 msec. When the count reaches 100 at step S28, then step S29 follows to store a key code "EO" in the key buffer KB, the key code "EO" (key up/down information) indicating a detection of the end of one stroke. This is detected in turn at step S3 of FIG. 2 to follow steps S4→S9→ S11→S12 where a stroke code, for example "23", corresponding to the character "C" is generated based on the contents of the stroke element memory EM, and stored in the stroke code memory CM. If the release of depression continues further and when the count reaches 200 at step S30 of the interruption routine, then step S31 follows where a key code "FO" is stored in the key buffer KB and the flag F is cleared. This is detected at step S3 to follow steps S4→S9. Since the key code is "FO" at step S9, step S10 follows where the stroke code "23" (in this case, one stroke code) stored in the stroke memory CM is read to generate a character code "A3" corresponding to the character "C" and store it in the data memory DM at the location indicated by the data pointer DP. Thereafter, at step S8 data of 20 characters stored in the data memory DM starting from the location indicated by the data pointer DP is read to store it in the display memory HM. After incrementing the content of the data pointer by +1, step S2 resumes to transfer the data in the display memory HM to the display 2 for displaying the character "C".

If portion m on the key pad (DPAD) of FIG. 1 is depressed, an input key code "70" is stored in the key buffer KB at step S26 of FIG. 3. This is detected at step S3 of FIG. 2 and thereafter, at step S4 the read-out key code is identified as "70" to follow step S5 where a next key code is stored. After release of depression of the key pad 1 on m and when the count of the key-off counter CT reaches 100, the key code "EO" is stored in the key buffer KB. Then step S5 follows step S6 where the read-out key code is identified as "EO". Therefore, step S7 follows to clear the flag F and at step S8 data of 20 characters starting from the location indicated by the data pointer DP is read out of the data memory DM to store it in the display memory. Thereafter, the content of the data pointer is incremented by +1 and step S2 resumes to display the data in the display memory HM to follow step S3 where a next key depression is stored.

As above, release after depression of the key pad 1 on portion m allows the execution of the function of displaying the contents of the data memory DM by 20 characters starting from the location indicated by the data pointer DP at that time.

As seen from the foregoing description of the present invention, not only hand-written characters can be input through the entire surface of the key pad but also control or command key input can be effected by depressing and releasing a particular portion m. Therefore, an additional command key group which is conventionally provided can be removed, thereby enabling the device to be manufactured at a low cost and to have improved operability. Upon detection of depression of a particular portion of the key pad, if the depression is detected continuously for a preset period without depression of another portion, then the key depression is considered as a command input and not as a usual stroke input for a hand-written character or pattern. Therefore, a command input is possible through the key pad, thereby remarkably improving the operability of the apparatus.

I claim:

1. An electronic apparatus with a pattern recognition function, comprising:
    coordinate input means for inputting coordinate data comprising a plurality of areas, wherein one of said plurality of areas is a specific area;
    judging means for judging whether a coordinate datum which has just been input by said coordinate input means is identical to a previously input coordinate datum;
    memory means for storing each input coordinate datum except for successive identical coordinate data in response to a judgment by said judging means;
    pattern recognition means for recognizing a pattern on the basis of the coordinate data stored in said memory means and
    control means for controlling said pattern recognition means to execute pattern recognition processes in response to coordinate data being input by said specific area of said coordinate input means.

2. An electronic apparatus according to claim 1, wherein said detection means is held disabled for a predetermined time after a predetermined coordinate data position of said coordinate input means has been enabled.

3. An electronic apparatus according to claim 1, wherein said processes include a display process.

4. An electronic apparatus with a pattern recognition function, comprising:

a key pad comprising pattern input members for inputting a handwritten pattern, said key pad having a plurality of areas, wherein one of said plurality of areas is a specific area;

judging means for judging whether a datum which has just been input by said key pad is identical to a previously input datum;

a stroke code memory for storing therein a recognition result code of each stroke element associated with the handwritten pattern in response to up-/down motion of pattern input members in any of said plurality of areas of said key pad, the recognition result code being stored for each input datum except for successive identical data in response to a judgment by said judging means;

recognition means for recognizing a pattern on the basis of the relation between a plurality of recognition result codes after a predetermined time after the occurrence of an up motion of said pattern input members;

detection means for detecting that a predetermined time has elapsed after the down and up motion of one of said pattern input members in said specific area on said key pad for inputting a command, wherein said specific area is an area for recognizing the pattern and for inputting the command; and display means for displaying, in response to the detection by said detection means, the pattern which has been recognized by said recognition means.

5. An electronic apparatus according to claim 4, wherein the predetermined time is substantially 25 msec.

* * * * *

UNITED STATES PATENT AND TRADEMARK OFFICE
CERTIFICATE OF CORRECTION

PATENT NO. : 4,953,226
DATED : August 28, 1990
INVENTOR(S) : SHIGERU MATSUYAMA

It is certified that error appears in the above-identified patent and that said Letters Patent is hereby corrected as shown below:

In the Drawings:
SHEET 2 OF 4

FIG. 2, "POUER ON" should read --POWER ON--.

COLUMN 2

Line 12, "character signal" should read --character input key pad (KPAD) 1 is constructed of eight key scan signal--.
Line 32, "memory FM" should read --memory HM--.
Line 63, "or" should read --of-- and "of" (first occurrence) should read --or--.

COLUMN 3

Line 67, "key pad (DPAD)" should read --key pad (KPAD)--.

COLUMN 4

Line 55, "means and" should read --means; and--.

Signed and Sealed this

Fourth Day of May, 1993

Attest:

MICHAEL K. KIRK

*Attesting Officer*     Acting Commissioner of Patents and Trademarks